United States Patent Office 3,024,227
Patented Mar. 6, 1962

3,024,227
LOW PRESSURE PROCESS FOR PRODUCTION OF OLEFIN POLYMERS WITH A PEROXIDE CONTAINING CATALYST
Gene Nowlin, Glen Burnie, Md., and Harold D. Lyons, Bartlesville, Okla., assignors to Phillips Petroleum Company, a corporation of Delaware
No Drawing. Filed Dec. 30, 1955, Ser. No. 556,482
9 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. However, it is often desired to produce higher molecular weight polymers which have desirable properties of heat stability and can be molded into vessels, pipes and tubing. Such uses cannot be made of the lower molecular weight polymers, for example, a polymer having a molecular weight of about 1000, since a polymer of this molecular weight is a wax-like material.

It is an object of this invention, therefore, to provide an improved process for the production of high molecular weight olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising (1) a metal halide selected from the group consisting of halides of titanium, zirconium, hafnium and germanium, (2) a peroxide corresponding to the formula R'OOR', wherein R' is hydrogen, an alkyl, aralkyl, alkaryl, cycloalkyl, acyl, alkyne or aryl radical, and (3) at least one component selected from the following: (a) an organometal halide corresponding to the formula $R_xMX_y$ wherein R is a saturated acyclic hydrocarbon radical, a saturated cyclic hydrocarbon radical, an aromatic hydrocarbon radical, or combination of these radicals, wherein M is a metal selected from the group consisting of aluminum, gallium, indium, thallium, and beryllium and wherein X is a halogen, and wherein $x$ and $y$ are integers, the sum of $x$ and $y$ being equal to the valence of the metal; (b) a mixture of an organic halide and at least one metal selected from the group consisting of sodium, potassium, lithium, rubidium, cesium, beryllium, magnesium, zinc, cadmium, mercury, aluminum, gallium, indium and thallium; and (c) a complex hydride corresponding to the formula $M'M''H_m$, wherein M' is an alkali metal, M'' is a metal selected from the group consisting of aluminum, gallium, indium and thallium, and $m$ is equal to the sum of the valences of the two metals. The improvement obtained when polymerizing an olefin in the presence of our novel catalyst is, firstly, that polymers of much higher molecular weight possessing very high impact strength and other desirable characteristics can be obtained than is true when certain of the prior art catalysts have been employed, and secondly, the polymerization reaction, particularly for ethylene, can be initiated and carried out at considerably lower temperatures and pressures than are necessary when employing the catalysts and the processes of the prior art.

The metal halide component of our catalyst system comprises the halides of the metals titanium, zirconium, hafnium and germanium. Examples of metal halides which can be used include titanium dichloride, titanium trichloride, titanium tetrachloride, titanium dibromide, titanium tribromide, titanium tetrabromide, titanium diiodide, titanium triiodide, titanium tetraiodide, titanium trifluoride, titanium tetrafluoride, zirconium dichloride, zirconium trichloride, zirconium tetrachloride, zirconium dibromide, zirconium tribromide, zirconium tetrabromide, zirconium tetraiodide, zirconium tetrafluoride, hafnium trichloride, hafnium tetrachloride, hafnium triiodide, hafnium tetraiodide, germanium dichloride, germanium trichloride, germanium tetrachloride, germanium dibromide, germanium tetrabromide, germanium diiodide, germanium tetraiodide, germanium difluoride, germanium tetrafluoride and the like. Mixtures of two or more of the metal halides can be used in the catalyst system of our invention.

In admixture with one or more of the metal halides described above, our novel catalyst comprises a peroxide corresponding to the formula R'OOR', wherein R' is hydrogen, an alkyl, aralkyl, alkaryl, cycloalkyl, acyl, alkyne, or aryl radical. These radicals may each contain from 1 to 20, inclusive, preferably not more than 10, carbon atoms. Examples of peroxides which can be used include hydrogen peroxide, methyl hydroperoxide, isopropyl hydroperoxide, tert-butyl hydroperoxide, cyclohexyl hydroperoxide, α,α-dimethyl-p-isopropylbenzyl hydroperoxide, dimethyl peroxide, di-n-propyl peroxide, di-tert-butyl peroxide, methyl ethyl peroxide, 3-methyl-3-hydroperoxy-1-butyne, 2-methyl-3-butynyl hydroperoxide, bis(2-methyl-3-butynyl) peroxide, dibenzoyl peroxide, diacetyl peroxide, dipropionyl peroxide, α,α-dinaphthyl peroxide, peroxyformic acid, peroxyacetic acid, peroxybutyric acid, peroxybenzoic acid, peroxycinnamic acid, diperoxyterephthalic acid, and the like.

In admixture with at least one of the metal halides and at least one of the peroxides as set forth above our catalyst comprises at least one organometal halide corresponding to the formula $R_xMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, thallium and beryllium, and wherein X is a halogen. The $x$ and $y$ are integers and the sum of $x$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), $C_{17}H_{35}BeI$, $CH_3BeBr$, 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like.

Alternatively, or in addition to the $R_xMX_y$ compounds set forth above, our catalyst comprises a mixture of one or more of the metal halides and one or more of the peroxides described above and a mixture of an organic halide and a free or elemental metal. These organic halides include chloro-, bromo-, iodo- and fluoro-substituted organic halides, and can be mono-, di-, tri- or tetra-substituted organic halides. Within the broad class of organic halides which is a component of our novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more desirably, the organic halide which is used in the catalyst is a lower alkyl monohalide having a maximum carbon chain length of not greater than 8 carbon atoms. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride. Also, alkenyl halides, such as allyl bromide, and alkynyl halides, such as propargyl chloride, can be used. The metals which are employed in admixture with an organic halide include one or more of sodium, potassium, lithium, ribidium, cesium, beryllium, magnesium, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

Alternatively, or in addition to the $R_xMX_y$ compounds and/or the mixture of an organic halide and a free metal, as set forth above, our catalyst comprises a mixture of one or more of the metal halides and one or more of the peroxides described above and a complex hydride corresponding to the formula $M'M''H_m$, wherein M' is an alkali metal, including sodium, potassium, lithium, rubidium and cesium, M'' is a metal selected from the group consisting of aluminum, gallium, indium and thallium, and $m$ is equal to the sum of the valences of the two metals. Examples of such complex hydrides are lithium aluminum hydride, potassium aluminum hydride, sodium aluminum hydride, cesium aluminum hydride, sodium gallium hydride, lithium thallium hydride, lithium indium hydride, lithium gallium hydride, rubidium aluminum hydride, and the like. The preferred member of this class of compounds is lithium aluminum hydride.

Among the catalyst compositions falling within this disclosure which are preferred because their use to catalyze the polymerization of olefins provides relatively high molecular weight polymers and/or permits the use of relatively low reaction temperatures and pressures are the following: a mixture of titanium tetrachloride and benzoyl peroxide with an approximately equimolar mixture of ethylaluminum dichloride and diethylaluminum chloride; a mixture of zirconium tetrachloride and benzoyl peroxide with an approximately equimolar mixture of ethylaluminum dichloride and diethylaluminum chloride; a mixture of titanium tetrachloride, benzoyl peroxide and lithium aluminum hydride; a mixture of titanium trichloride and benzoyl peroxide with an approximately equimolar mixture of ethylaluminum dichloride and diethylaluminum chloride; a mixture of titanium tetrachloride and di-tert-butyl peroxide with an approximately equimolar mixture of ethylaluminum dichloride and diethylaluminum chloride; and a mixture of titanium tetrachloride, benzoyl peroxide, ethyl chloride and free or elemental sodium.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. As much as 50 to 2000 grams of polymer can be obtained per gram of catalyst composition utilized in the reaction. When a continuous flow system is employed, the concentration of the total catalyst composition is usually in the range from 0.01 weight percent to 1.0 weight percent, or higher.

The ratio of the amounts of peroxide to metal halide will generally be in the range of 0.05 to 50, preferably 0.2 to 3 mols peroxide per mol of metal halide. The ratio of the amounts of organometal halide to metal halide will usually be in the range of 0.05 to 50, preferably 0.2 to 3 mols of organometal halide per mol of metal halide. The ratio of the amounts of organic halide, metal and metal halide will be in the range of 0.02 to 50 mols of the organic halide per mol of the metal halide and from 0.02 to 50 mols of the metal per mol of the metal halide. A preferred ratio is from 0.2 to 3 mols of organic halide per mol of metal halide and from 0.2 to 3 mols of metal per mol of the metal halide. The ratio of the amounts of the complex hydride to metal halide will generally be in the range of 0.05 to 50, preferably 0.2 to 3, mols of complex hydride per mol of metal halide.

The materials which are polymerized in accordance with this invention can be defined broadly as polymerizable hydrocarbons. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the proces of this invention are propylene, 1-butene, 1-hexene and 1-octene. Branched olefin olefins can also be used, such as isobutylene. Also, 1,1-dialkyl-substituted and 1,2-dialkyl-substituted ethylenes can also be used, such as butene-2, pentene-2, hexene-2, heptene-3, 2-methylbutene-1, 2-methylhexene-1, 2-ethylheptene-1, and the like. Examples of the di- and polyolefins in which the double bonds are in non-conjugated positions and which can be used in accordance wtih this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Aryl olefins, e.g., styrene and alkyl-substituted styrenes can also be polymerized to a solid polymer in the process of this invention. This invention is also applicable to the polymerization of a monomeric material comprising conjugated dienes containing from 4 to 8, inclusive, carbon atoms. Examples of conjugated dienes which can be used include 1,3-butadiene, 2-methyl-1,3-butadiene, 2,3-dimethyl-1,3-butadiene, 2-methyl-1,3- pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like. It is within the scope of the invention to polymerize such conjugated dienes either alone or in admixture with each other and/or with one or more other compounds containing an active $CH_2=C<$ group which are copolymerizable therewith. Included among these latter compounds are monoolefins such as those described hereinabove. Other examples of compounds containing an active $CH_2=C<$ group which are copolymerizable with one or more conjugated dienes are styrene, acrylonitrile, methacrylonitrile, methacrylate, methyl methacrylate, vinyl acetate, vinyl chloride, 2-methyl-5-vinylpyridine, 2-vinylpyridine, 4-vinylpyridine, etc.

One of the important advantages obtained in the polymerization of olefins in the presence of our novel catalyst is that lower temperatures and presures can be used than in certain of the prior art processes. The temperature can be varied over a rather broad range, however, such as from —250° F. and below to 500° F. and above. The preferred temperature range is from 50 to 300° F. Although pressures ranging from atmospheric and below up to 30,000 p.s.i.g. or higher can be employed, a pressure from atmospheric to 1000 p.s.i.g. is usually preferred with a pressure in the range of 100 to 700 p.s.i.g. being even more desirable.

In this connection, it is noted that it is preferred to carry out the reaction in the presence of an inert, organic diluent, preferably a hydrocarbon, with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane are especially useful when the process is carried out at low temperatures. However, the higher molecular weight paraffins and cycloparaffins, such as isooctane, cyclohexane and methylcyclohexane, and aromatic diluents, such as benzene, toluene and the like, can also be used, particularly when operating at higher temperatures. Halogenated hydrocarbons, such as halogenated aromatics, halogenated paraffins, halogenated cycloparaffins and the like, are also useful as diluents. Mixtures of any two or more of the above-named diluents can also be employed in the process of this invention.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 50 to 300° F., falls within the range of one second to an hour or more. In the batch process, the time for the reaction can also vary widely, such as up to 24 hours or more.

In charging the catalyst components to the reaction vessel, it is preferred to operate so as to ensure that the peroxide is not present in the reaction vessel with the organometal halide, the mixture of an organic halide and a metal and/or the complex hydride unless the metal halide is also included in the reaction mixture. In this regard it is desirable to mix the metal halide and the peroxide before charging or to charge these two components simultaneously.

It has been found that various materials in some instances may have a tendency to inactivate the catalyst compositions of this invention. These materials include carbon dioxide, oxygen and water. Therefore, it is usually desirable to free the polymerizable hydrocarbon from these materials, as well as from other materials which may tend to inactivate the catalyst before contacting the hydrocarbon with the catalyst. Any of the known means for removing such contaminants can be employed. When a diluent is used in the process, this material should generally be freed of contaminants, such as water, oxygen, and the like. It is desirable, also, that air and moisture be removed from the reaction vessel before the reaction is carried out, however, in some cases small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, any excess olefin is vented and the contents of the reactor, including the solid polymer swollen with diluent, are then treated to inactivate the catalyst and remove the catalyst residues. The inactivation of the catalyst can be accomplished by washing with an alcohol, water or other suitable material. In some instances, the catalyst inactivating treatment also removes a major proportion of the catalyst residues while in other cases it may be necessary to treat the polymer with an acid, base or other suitable material in order to effect the desired removal of the catalyst residues. The treatment of the polymer may be carried out in a comminution zone, such as a Waring Blendor, so that a finely divided polymer is thereby provided. The polymer is then separated from the diluent and treating agents, e.g., by decantation or absorption, after which the polymer is dried. The diluent and treating agents can be separated by any suitable means, e.g., by fractional distillation, and reused in the process.

A more comprehensive understanding of the invention may be obtained by referring to the following illustrative examples which are not intended, however, to be unduly limitative.

EXAMPLE I

Ethylene was polymerized in a 2700 cubic centimeter stainless steel reactor in accordance with the procedure described hereinbelow.

Two and forty-two hundredths grams (0.01 mol) of benzoyl peroxide was added to 100 cubic centimeters of benzene (dried over sodium and distilled) to which had been added 0.949 gram (0.005 mol) of titanium tetrachloride. The color of the titanium tetrachloride-benzene mixture was yellow until the benzoyl peroxide was added, at which time the color turned dark brown. This mixture was refluxed for twenty minutes under purified nitrogen, at which time the color was noted to be a very dark orange brown. This mixture was then added to the reactor under purified nitrogen pressure along with an additional 380 cubic centimeters of benzene. Four cubic centimeters of aluminum sesquichloride, prepared as described hereinbelow, was mixed with 20 cubic centimeters of benzene and then added to the reactor. The reactor was then placed in a rocker and pressured with ethylene to 300 p.s.i.g. An electric heater attached to the reactor was used to maintain the temperature at 300° F. Ethylene was pressured into the reactor from time to time as the reaction progressed and the temperature decreased. After 3 hours and 52 minutes, the reactor was repressured to 550 p.s.i.g. with ethylene. The reaction was allowed to continue overnight, and after an over-all reaction time of 16½ hours, the reactor was cooled and then opened. A dark brown polymer was recovered which immediately turned white upon contact with methyl alcohol. The polymer was placed in a Waring Blendor along with about 500 cubic centimeters of methyl alcohol and comminuted at speeds ranging from 8000 to 16,000 r.p.m. The polymer was then filtered and placed on porcelain dishes in a vacuum oven and dried for 24 hours at 75° C. Approximately 50 grams of polymer were obtained.

The properties of a sample of the ethylene polymer produced as described above are presented below in Table I.

Table I

| | |
|---|---|
| Molecular weight (based on melt index) | 38,575 |
| Density, gms./cc. at room temperature | 0.960 |
| Flexibility | Good |
| Impact strength (falling ball method) | >72" |
| Melt index | 1.198 |
| Melting point, °F | 251±2 |
| Moldability | Good |

EXAMPLE II

Ethylene was polymerized in a 1400 cubic centimeter stirred reactor following the procedure described hereinbelow.

In this example, 2.42 grams of benzoyl peroxide, 0.949 gram of titanium tetrachloride and 4 cubic centimeters of aluminum sesquichloride, prepared as described hereinbelow, were charged to the reactor which contained 400 cubic centimeters of cyclohexane (dried over sodium and distilled). After all of the catalyst components were charged, ethylene was pressured into the reactor until a pressure of 300 p.s.i.g. at 100° F. was reached. The heating unit with which the reactor was supplied was started, and it was noted that the reaction started almost immediately as evidenced by the drop in reactor pressure and the accompanying temperature rise. During the polymerization, the maximum temperature reached was 300° F. After 50 minutes, the reactor was again pressured with ethylene to 300 p.s.i.g. The reactor was repressured on two other occasions, namely, one 7 minutes after the first repressuring and another 30 minutes later. The heat source was removed 45 minutes after the last time the reactor was repressured, and the reactor then allowed to cool. The reactor was then opened and found to be filled with a tough, fibrous polymer which was swollen with the cyclohexane solvent. This polymer was removed from the reactor, placed in a Waring Blendor with an excess of methyl alcohol and comminuted for about thirty minutes. The polymer was then recovered by filtration and dried overnight in a vacuum oven maintained at 75° C.

The properties of a sample of the ethylene polymer produced as described above are presented below in Table II.

Table II

| | |
|---|---|
| Molecular weight (based on inherent viscosity) | 35,964 |
| Density, gms./cc. at room temperature | 0.957 |
| Impact strength (falling ball method) | 48" |
| Melting point, °F | 246±3 |
| Inherent viscosity [1] | 1.471 |

[1] The inherent viscosity was obtained at 130° C., using a solution of 0.2 gram of polymer per 100 milliliters of tetralin.

EXAMPLE III

Ethylene was polymerized in a 1200 cubic centimeter stainless steel rocking autoclave in the presence of a catalyst consisting of a mixture of 3.55 grams of titanium tetrachloride and 4 grams of a mixture of diethylaluminum chloride and ethylaluminum dichloride. The mixture of diethylaluminum chloride and ethylaluminum dichloride was prepared in accordance with the procedure described hereinafter. The catalyst was dissolved in 500 cubic centimeters of benzene (dried over sodium) and charged to the autoclave while maintaining the autoclave under a nitrogen atmosphere. The ethylene was passed through a purification system to remove oxygen, carbon dioxide and water vapor prior to entering the autoclave. The purification system comprised a pyrogallol solution, a sodium hydroxide solution and drying agents. The ethylene was charged to the autoclave while maintaining the catalyst and diluent at atmospheric temperature. The polymerization of the ethylene was immediately initiated, and as the addition of ethylene continued the temperature of the reaction mixture increased rapidly to 175° F. The ethylene was passed into the autoclave as rapidly as the limitations of the purification system would permit. Maximum pressure reached in the autoclave was 300 p.s.i.g. At the end of a 15 minute reaction period, the bomb was opened, and a polymer of ethylene was present as a suspension in the benzene solution. One hundred cubic centimeters of butyl alcohol was added to the autoclave to inactivate the catalyst. The solid polymer was filtered from the benzene-alcohol mixture and then washed with isopropyl alcohol. After filtering the polymer from the isopropyl alcohol, it is dried overnight in a vacuum oven at about 140° F. About 100 grams of polyethylene was obtained.

The properties of a sample of the ethylene polymer produced as described above are presented below in Table III.

Table III

| | |
|---|---|
| Molecular weight (based on melt index) | 9,025. |
| Density, grams/cc. at room temperature | 0.941. |
| Flexibility | Quite brittle. |
| Impact strength (falling ball method) | Broke at 6". |
| Melt index | 445.0. |
| Melting point °F | 242±2. |
| Inherent viscosity | 0.451. |
| Color | Light tan. |

The mixture of diethylaluminum chloride and ethylaluminum dichloride was prepared by placing 150 grams of aluminum shavings in a flask fitted with a reflux condenser and heated to about 70 C. A trace of iodine was added to the flask to act as a catalyst, and ethyl chloride was charged to the flask in liquid phase. The temperature of the reaction mixture was maintained in the range of 120 to 150° C. during the addition of the ethyl chloride, and the reaction mixture was maintained under a nitrogen atmosphere. When substantially all of the aluminum shavings had reacted with the ethyl chloride, the liquid product was removed from the flask and fractionally distilled at 4.5 millimeters of mercury pressure in a packed distillation column. The distillate, boiling at 72 to 74° C. at 4.5 millimeters of mercury pressure, was used in the catalyst compositions of Examples I, II and III in the amount specified hereinabove. This fraction boiling at 72 to 74° C. was analyzed and found to contain 47.4 weight percent chlorine. The theoretical chlorine content for an equimolar mixture of diethylaluminum chloride and ethylaluminum dichloride is 43 weight percent.

From a consideration of the data shown in Tables I, II and III, it is seen that the addition of benzoylperoxide to the catalyst composition consisting of titanium tetrachloride and a mixture of diethylaluminum chloride and ethylaluminum dichloride resulted in an ethylene polymer having a higher molecular weight and possessing greatly increased impact strength.

The polymers produced in accordance with this invention have utility in applications where solid plastics are used. They can be used to impregnate paper and fabrics, and they can be molded to form articles of any desired shape, such as bottles and other containers for liquids. Furthermore, they can be formed into pipe by extrusion.

As will be evident to those skilled in the art, many variations and modifications can be practiced within the scope of the disclosure and claims of this invention. The invention resides in an improved polymerization process for olefins as described herein comprising the use of a novel catalyst composition and the catalyst so produced, said catalyst composition comprising (1) a metal halide selected from the group consisting of halides of titanium, zirconium, hafnium and germanium, (2) a peroxide corresponding to the formula R'OOR', wherein R' is a member selected from the group consisting of hydrogen, alkyl, aralkyl, alkaryl, cycloalkyl, acyl, alkyne and aryl radicals, and (3) at least one component selected from the following: (a) an organometal halide corresponding to the formula $R_xMX_y$, wherein R is a saturated acyclic hydrocarbon radical, a saturated cyclic hydrocarbon radical, an aromatic hydrocarbon radical, and combinations of these radicals, M is a metal selected from the group consisting of aluminum, gallium, indium, thallium, and beryllium, and X is a halogen, and wherein $x$ and $y$ are integers, the sum of $x$ and $y$ being equal to the valence of the metal M; (b) a mixture of an organic halide and at least one member selected from the group consisting of sodium, potassium, lithium, rubidium, cesium, beryllium, magnesium, zinc, cadmium, mercury, aluminum, gallium, indium and thallium; and (c) a complex hydride corresponding to the formula $M'M''H_m$, wherein M' is an alkali metal, M'' is a metal selected from the group consisting of aluminum, gallium, indium and thallium, and $m$ is equal to the sum of the valences of the two metals M' and M''.

We claim:

1. A method for producing a solid polymer of an aliphatic 1-olefin having up to and including eight carbon atoms per molecule which comprises contacting said olefin with a catalyst consisting essentially of (1) a metal halide selected from the group consisting of halides of titanium, zirconium, and hafnium, (2) a peroxide corresponding to the formula R'OOR', wherein R' is a member selected from the group consisting of hydrogen, alkyl, aralkyl, alkaryl, cycloalkyl, acyl, alkyne and aryl radicals, (3) an organometal halide corresponding to the formula $R_xMX_y$, wherein R is a saturated acyclic hydrocarbon radical, a saturated cyclic hydrocarbon radical, an aromatic hydrocarbon radical, and combinations of these radicals, M is a metal selected from the group consisting of aluminum, gallium, indium, and thallium, and X is a halogen, and wherein $x$ and $y$ are integers, the sum of $x$ and $y$ being equal to the valence of the metal M, said catalyst containing from 0.05 to 50 mols of said peroxide per mol of said metal halide and from 0.05 to 50 mols of said organometal halide per mol of said metal halide, and said contacting occurring at a temperature in the range of $-250°$ F. to $500°$ F., in the presence of a hydrocarbon diluent, inert and liquid under the conditions of the method, at a pressure sufficient to maintain said diluent in liquid phase; and recovering the solid polymer so produced.

2. A method in accordance with claim 1 wherein the ratio of the amounts of the components of said catalyst are in the following ranges: from 0.2 to 3 mols of said peroxide per mol of said metal halide; from 0.2 to 3 mols of said organometal halide per mol of said metal halide; from 0.2 to 3 mols of said hydrocarbon halide per mol of said metal halide and from 0.2 to 3 mols of said metal per mol of said metal halide; and from 0.2 to 3 mols of said complex hydride per mol of said metal halide.

3. A method for polymerizing ethylene with comprises contacting ethylene with a catalyst consisting essentially of a mixture of titanium tetrachloride, benzoyl peroxide, and an approximately equimolar mixture of diethylaluminum chloride and ethylaluminum dichloride, said catalyst containing from 0.2 to 3 mols of said benzoyl peroxide per mol of said titanium tetrachloride and from 0.02 to 3 mols of said equimolar mixture per mol of said titanium tetrachloride, said contacting occurring in the presence of a hydrocarbon diluent, inert and liquid under conditions of the method, at a temperature in the range of 50 to 300° F., and a pressure in the range of 100 to 700 p.s.i.g.

4. A process for the polymerization of 1-olefins to form solid polymers which comprises contacting said olefins with a catalyst consisting essentially of an organometal halide of a Group III–A metal, the organo portion of said compound being a hydrocarbon, a reducible metal salt of a metal of Group IV–B of the Mendelyeev Periodic Table and a peroxide catalyst.

5. A method for polymerizing ethylene to a solid polyethylene which comprises contacting said ethylene with a catalyst consisting essentially of a mixture of titanium tetrachloride, benzoyl peroxide and an approximately equimolar mixture of ethylaluminum dichloride and diethylaluminum chloride.

6. A method for polymerizing ethylene to a solid polyethylene which comprises contacting said ethylene with a catalyst consisting essentially of a mixture of zirconium tetrachloride, benzoyl peroxide and an approximately equimolar mixture of ethylaluminum dichloride and diethylaluminum chloride.

7. A method for polymerizing ethylene to a solid polyethylene which comprises contacting said ethylene with a catalyst consisting essentially of a mixture of titanium trichloride, benzoyl peroxide and an approximately equimolar mixture of ethylaluminum dichloride and diethylaluminum chloride.

8. A method for polymerizing ethylene to a solid polyethylene which comprises contacting said ethylene with a catalyst consisting essentially of a mixture of titanium tetrachloride, di-tert-butyl peroxide and an approximately equimolar mixture of ethylaluminum dichloride and diethylaluminum chloride.

9. A method for polymerizing 1-olefins to form solid polymers which comprises contacting said olefins with a catalyst consisting essentially of (1) a metal halide selected from the group consisting of halides of titanium, zirconium, and hafnium, (2) a peroxide corresponding to the formula R'OOR', wherein R' is a member selected from the group consisting of hydrogen, alkyl, aralkyl, alkaryl, cycloalkyl, acyl, alkyne and aryl radicals, and (3) an organometal halide corresponding to the formula $R_xMX_y$, wherein R is a saturated acyclic hydrocarbon radical, a saturated cyclic hydrocarbon radical, an aromatic hydrocarbon radical, and combinations of these radicals, M is a metal selected from the group consisting of aluminum, gallium, indium, and thallium, and X is a halogen, and wherein $x$ and $y$ are integers, the sum of $x$ and $y$ being equal to the valence of the metal M.

References Cited in the file of this patent

UNITED STATES PATENTS

| Number | Name | Date |
| --- | --- | --- |
| 1,793,935 | Kaufler et al. | Feb. 24, 1931 |
| 2,388,138 | Greenewalt | Oct. 30, 1945 |
| 2,428,910 | Foster | Oct. 14, 1947 |
| 2,482,877 | Schmerling | Sept. 27, 1949 |
| 2,728,755 | Weisemann | Dec. 27, 1955 |
| 2,728,756 | Friedlander | Dec. 27, 1955 |
| 2,762,791 | Pease et al. | Sept. 11, 1956 |
| 2,816,883 | Larchar | Dec. 17, 1957 |
| 2,824,145 | McCall | Feb. 18, 1958 |
| 2,845,414 | Schutze | July 29, 1958 |
| 2,846,427 | Findlay | Aug. 5, 1958 |

FOREIGN PATENTS

| Number | Country | Date |
| --- | --- | --- |
| 534,792 | Belgium | Jan. 31, 1955 |